(12) United States Patent
Ginter, Jr. et al.

(10) Patent No.: US 9,313,638 B2
(45) Date of Patent: Apr. 12, 2016

(54) DEVICE INDEPENDENT CALLER DATA ACCESS FOR EMERGENCY CALLS

(71) Applicant: TeleCommunication Systems, Inc., Annapolis, MD (US)

(72) Inventors: Thomas Ginter, Jr., Bellevue, WA (US); Salman Ali, Issaquah, WA (US); Tim Pann, Shoreline, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 59 days.

(21) Appl. No.: 13/967,699

(22) Filed: Aug. 15, 2013

(65) Prior Publication Data

US 2014/0051381 A1    Feb. 20, 2014

Related U.S. Application Data

(60) Provisional application No. 61/683,506, filed on Aug. 15, 2012.

(51) Int. Cl.
*H04W 4/22* (2009.01)
*H04M 1/57* (2006.01)
*H04W 12/00* (2009.01)

(52) U.S. Cl.
CPC *H04W 4/22* (2013.01); *H04M 1/57* (2013.01); *H04M 1/575* (2013.01); *H04W 12/00* (2013.01)

(58) Field of Classification Search
USPC ..................................................... 455/404.1
See application file for complete search history.

(56) References Cited

U.S. PATENT DOCUMENTS

| 1,103,073 | A | 7/1914 | O'Connell |
| 4,445,118 | A | 4/1984 | Taylor et al. |

(Continued)

FOREIGN PATENT DOCUMENTS

| SE | WO99/21380 | 4/1999 |
| WO | WO00/14925 | 3/2000 |

(Continued)

OTHER PUBLICATIONS

Le-Pond Chin, Jyh-Hong Wen, Ting-Way Liu, The Study of the Interconnection of GSM Mobile Communications Systems Over IP Based Network, May 6, 2001, IEEE, Vehicular Technology Conference, vol. 3, pp. 2219-2223.

(Continued)

*Primary Examiner* — Lester Kincaid
*Assistant Examiner* — Daniel G Bassett
(74) *Attorney, Agent, or Firm* — William H. Bollman

(57) ABSTRACT

Device independent access to stored caller data during an emergency communications event. A call server intercepts an emergency call and determines the capabilities of a calling device. Based on calling device capability, the call server uses one or more of the following device independent methods to ascertain a caller identity, independent of a calling device: interactive voice response redirect, HTTP authentication, SIP INFO method, biometric recognition, human interaction, and alternate number dialing. A caller identity is then used to query a subscriber database for a unique caller profile database key (CPDBK) assigned to the caller (unless a CPDBK is already determined). A call server uses a CPDBK to query a caller profile database (CPDB) for relevant caller data. Relevant caller data and the intercepted emergency communications event are then passed to an emergency call processing system, whereby relevant caller data may be used to more effectively address an emergency situation.

15 Claims, 8 Drawing Sheets

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,737,916 A | 4/1988 | Ogawa |
| 4,891,638 A | 1/1990 | Davis |
| 4,891,650 A | 1/1990 | Scheffer |
| 4,939,662 A | 7/1990 | Numura |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Scheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,389,934 A | 2/1995 | Kass |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,557,254 A | 9/1996 | Johnson |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,122 A | 6/1997 | Shah |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,684,951 A | 11/1997 | Goldman |
| 5,689,245 A | 11/1997 | Noreen |
| 5,689,269 A | 11/1997 | Norris |
| 5,689,809 A | 11/1997 | Grube |
| 5,699,053 A | 12/1997 | Jonsson |
| 5,727,057 A | 3/1998 | Emery |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,774,824 A | 6/1998 | Streit |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,801,700 A | 9/1998 | Ferguson |
| 5,802,492 A | 9/1998 | DeLorrme |
| 5,806,000 A | 9/1998 | Vo |
| 5,809,415 A | 9/1998 | Rossman |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,883,940 A | 3/1999 | Thornton |
| 5,896,369 A | 4/1999 | Warsta |
| 5,920,821 A | 7/1999 | Seaholtz |
| 5,922,074 A | 7/1999 | Richard |
| 5,926,118 A | 7/1999 | Hayashida |
| 5,930,250 A | 7/1999 | Klok |
| 5,944,768 A | 8/1999 | Ito |
| 5,953,398 A | 9/1999 | Hill |
| 5,960,362 A | 9/1999 | Grob |

(56) References Cited

U.S. PATENT DOCUMENTS

| | | |
|---|---|---|
| 5,974,054 A | 10/1999 | Couts |
| 5,978,685 A | 11/1999 | Laiho |
| 5,982,301 A | 11/1999 | Ohta |
| 5,983,099 A | 11/1999 | Yao |
| 5,983,109 A | 11/1999 | Montoya |
| 5,987,323 A | 11/1999 | Houtari |
| 5,998,111 A | 12/1999 | Abe |
| 5,999,124 A | 12/1999 | Sheynblat |
| 6,002,936 A | 12/1999 | Roel-Ng |
| 6,014,602 A | 1/2000 | Kithol |
| 6,032,051 A | 2/2000 | Hall |
| 6,035,025 A | 3/2000 | Hanson |
| 6,035,253 A | 3/2000 | Hayahi |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,091,957 A | 7/2000 | Larkins |
| 6,101,378 A | 8/2000 | Barabush |
| 6,108,533 A | 8/2000 | Brohoff |
| 6,115,611 A | 9/2000 | Kimoto |
| 6,122,503 A | 9/2000 | Daly |
| 6,122,520 A | 9/2000 | Want |
| 6,124,810 A | 9/2000 | Segal |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,516 B1 | 1/2001 | Watanabe |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schnieder |
| 6,178,506 B1 | 1/2001 | Quick, Jr. |
| 6,181,935 B1 | 1/2001 | Gossman |
| 6,181,939 B1 | 1/2001 | Ahvenainen |
| 6,182,006 B1 | 1/2001 | Meek |
| 6,182,227 B1 | 1/2001 | Blair |
| 6,185,426 B1 | 2/2001 | Alperovich |
| 6,188,354 B1 | 2/2001 | Soliman |
| 6,188,752 B1 | 2/2001 | Lesley |
| 6,188,909 B1 | 2/2001 | Alananra |
| 6,188,957 B1 | 2/2001 | Bechtolsheim |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,204,844 B1 | 3/2001 | Fumarolo |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feaugue |
| 6,249,680 B1 | 6/2001 | Wax |
| 6,249,742 B1 | 6/2001 | Frriederich |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,278,936 B1 | 8/2001 | Jones |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,317,684 B1 | 11/2001 | Roeseler |
| 6,321,091 B1 | 11/2001 | Holland |
| 6,321,092 B1 | 11/2001 | Fitch |
| 6,321,158 B1 | 11/2001 | DeLorme |
| 6,321,257 B1 | 11/2001 | Kotala |
| 6,324,542 B1 | 11/2001 | Wright, Jr. et al. |
| 6,327,473 B1 | 12/2001 | Soliman |
| 6,327,479 B1 | 12/2001 | Mikkola |
| 6,331,825 B1 | 12/2001 | Ladner |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,366,782 B1 | 4/2002 | Fumarolo |
| 6,366,856 B1 | 4/2002 | Johnson |
| 6,367,019 B1 | 4/2002 | Ansell |
| 6,370,389 B1 | 4/2002 | Isomursu |
| 6,377,209 B1 | 4/2002 | Krasner |
| 6,397,143 B1 | 5/2002 | Paschke |
| 6,400,314 B1 | 6/2002 | Krasner |
| 6,400,943 B1 | 6/2002 | Montoya |
| 6,400,958 B1 | 6/2002 | Isomursu |
| 6,411,254 B1 | 6/2002 | Moeglein |
| 6,415,224 B1 | 7/2002 | Wako |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,434,381 B1 | 8/2002 | Moore |
| 6,441,752 B1 | 8/2002 | Fomukong |
| 6,442,384 B1 | 8/2002 | Shah |
| 6,442,391 B1 | 8/2002 | Johansson |
| 6,449,473 B1 | 9/2002 | Raivisto |
| 6,449,476 B1 | 9/2002 | Hutchinson, IV |
| 6,456,852 B2 | 9/2002 | Bar |
| 6,463,272 B1 | 10/2002 | Wallace |
| 6,466,788 B1 | 10/2002 | Carlsson |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,722 B1 | 3/2003 | Heinrich |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,522 B1 | 4/2003 | Flynn |
| 6,549,776 B1 | 4/2003 | Joong |
| 6,549,844 B1 | 4/2003 | Egberts |

(56) References Cited

U.S. PATENT DOCUMENTS

| | | |
|---|---|---|
| 6,556,832 B1 | 4/2003 | Soliman |
| 6,560,461 B1 | 5/2003 | fomukong |
| 6,560,534 B2 | 5/2003 | Abraham |
| 6,563,824 B1 | 5/2003 | Bhatia |
| 6,564,261 B1 | 5/2003 | Gudjonsson |
| 6,570,530 B2 | 5/2003 | Gaal |
| 6,571,095 B1 | 5/2003 | Koodli |
| 6,571,174 B2 | 5/2003 | Rigazio |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,423 B1 | 9/2003 | Cooper |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,640,185 B2 | 10/2003 | Tokota |
| 6,643,516 B1 | 11/2003 | Stewart |
| 6,650,288 B1 | 11/2003 | Pitt |
| 6,661,353 B1 | 12/2003 | Gopen |
| 6,661,372 B1 | 12/2003 | Girerd |
| 6,665,540 B2 | 12/2003 | Rantalainen et al. |
| 6,665,541 B1 | 12/2003 | Krasner |
| 6,665,613 B2 | 12/2003 | Duvall |
| 6,665,715 B1 | 12/2003 | Houri |
| 6,671,620 B1 | 12/2003 | Garin |
| 6,677,894 B2 | 1/2004 | Sheynblat |
| 6,680,694 B1 | 1/2004 | Knockheart |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,652 B1 | 4/2004 | Sanqunetti |
| 6,721,716 B1 | 4/2004 | Gross |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,751,654 B2 * | 6/2004 | Massarani et al. ............ 709/219 |
| 6,756,938 B2 | 6/2004 | Zhao |
| 6,757,266 B1 | 6/2004 | Hundscheidt |
| 6,757,544 B2 | 6/2004 | Rangarajan |
| 6,757,545 B2 | 6/2004 | Nowak |
| 6,766,174 B1 | 7/2004 | Kenyon |
| 6,771,639 B1 | 8/2004 | Holden |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,801,850 B1 | 10/2004 | Wolfson |
| 6,804,524 B1 | 10/2004 | Vandermaijden |
| 6,807,534 B1 | 10/2004 | Erickson |
| 6,810,323 B1 | 10/2004 | Bullock |
| 6,810,405 B1 | 10/2004 | LaRue |
| 6,813,264 B2 | 11/2004 | Vassilovski |
| 6,813,501 B2 | 11/2004 | Kinnunen |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,816,782 B1 | 11/2004 | Walters |
| 6,819,919 B1 | 11/2004 | Tanaka |
| 6,820,269 B2 | 11/2004 | Baucke et al. |
| 6,829,475 B1 | 12/2004 | Lee |
| 6,829,532 B2 | 12/2004 | Obradovich |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,839,630 B2 | 1/2005 | Sakamoto |
| 6,842,696 B2 | 1/2005 | Silvester |
| 6,842,715 B1 | 1/2005 | Gaal |
| 6,845,321 B1 | 1/2005 | Kerns |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,329 B1 | 5/2005 | Wolfson |
| 6,898,516 B2 | 5/2005 | Pechatnikov |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,910,818 B2 | 6/2005 | McLoone |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,925,603 B1 | 8/2005 | Naito |
| 6,930,634 B2 | 8/2005 | Peng |
| 6,934,705 B2 | 8/2005 | Tu |
| 6,937,187 B2 | 8/2005 | Van Diggelen |
| 6,937,872 B2 | 8/2005 | Krasner |
| 6,940,950 B2 | 9/2005 | Dickinson et al. |
| 6,941,144 B2 | 9/2005 | Stein |
| 6,944,535 B2 | 9/2005 | Iwata |

(56) References Cited

U.S. PATENT DOCUMENTS

| | | |
|---|---|---|
| 6,944,540 B2 | 9/2005 | King |
| 6,947,772 B2 | 9/2005 | Minear |
| 6,950,058 B1 | 9/2005 | Davis |
| 6,957,068 B2 | 10/2005 | Hutchinson |
| 6,957,073 B2 | 10/2005 | Bye |
| 6,961,562 B2 | 11/2005 | Ross |
| 6,963,557 B2 | 11/2005 | Knox |
| 6,963,748 B2 | 11/2005 | Chithambaram |
| 6,965,754 B2 | 11/2005 | King |
| 6,965,767 B2 | 11/2005 | Maggenti |
| 6,968,044 B2 | 11/2005 | Beason |
| 6,970,871 B1 | 11/2005 | Rayburn |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,990,081 B2 | 1/2006 | Schaefer |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,058,506 B2 | 6/2006 | Kawase |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,089,110 B2 | 8/2006 | Pechatnikov |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rosseau |
| 7,110,773 B1 | 9/2006 | Wallace |
| 7,136,466 B1 | 11/2006 | Gao |
| 7,136,838 B1 | 11/2006 | Peinado |
| 7,142,196 B1 | 11/2006 | Connor |
| 7,142,205 B2 | 11/2006 | Chithambaram |
| 7,145,900 B2 | 12/2006 | Nix |
| 7,151,946 B2 | 12/2006 | Maggenti |
| 7,167,187 B2 | 1/2007 | Scott |
| 7,171,220 B2 | 1/2007 | Belcea |
| 7,171,304 B2 | 1/2007 | Wako |
| 7,177,397 B2 | 2/2007 | Mccalmont |
| 7,177,398 B2 | 2/2007 | Meer |
| 7,177,399 B2 | 2/2007 | Dawson |
| 7,184,418 B1 | 2/2007 | Baba |
| 7,200,380 B2 | 4/2007 | Havlark |
| 7,202,801 B2 | 4/2007 | Chou |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,245,910 B2 | 7/2007 | Osmo |
| 7,260,186 B2 | 8/2007 | Zhu |
| 7,260,384 B2 | 8/2007 | Bales |
| 7,266,376 B2 | 9/2007 | Nakagawa |
| 7,286,929 B2 | 10/2007 | Staton |
| 7,330,899 B2 | 2/2008 | Wong |
| 7,333,480 B1 | 2/2008 | Clarke |
| 7,340,241 B2 | 3/2008 | Rhodes |
| 7,369,508 B2 | 5/2008 | Parantainen |
| 7,369,530 B2 | 5/2008 | Keagy |
| 7,403,766 B2 * | 7/2008 | Hodge .................. 455/411 |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,450,951 B2 | 11/2008 | Vimpari |
| 7,453,990 B2 | 11/2008 | Welenson |
| 7,477,903 B2 | 1/2009 | Wilcock |
| 7,495,608 B1 | 2/2009 | Chen |
| 7,522,581 B2 | 4/2009 | Acharya |
| 7,565,157 B1 | 7/2009 | Ortega |
| 7,567,661 B1 * | 7/2009 | Wood et al. .............. 379/201.02 |
| 7,602,886 B1 | 10/2009 | Beech |
| 7,623,447 B1 | 11/2009 | Faccin |
| 7,627,331 B2 | 12/2009 | Winterbottom |
| 7,653,544 B2 | 1/2010 | Bradley |
| 7,660,321 B2 | 2/2010 | Cortes |
| 7,702,081 B1 | 4/2010 | Klesper |
| 7,711,094 B1 | 5/2010 | Olshansky |
| 7,739,033 B2 | 6/2010 | Murata |
| 7,747,258 B2 | 6/2010 | Farmer |
| 7,751,614 B2 | 7/2010 | Funakura |
| 7,774,003 B1 | 8/2010 | Ortega |
| 7,783,297 B2 | 8/2010 | Ishii |
| 7,822,823 B2 | 10/2010 | Jhanji |
| 7,881,233 B2 | 2/2011 | Bieselin |
| 7,881,730 B2 | 2/2011 | Sheha |
| 7,895,263 B1 | 2/2011 | Kirchmeier |
| 7,937,067 B2 | 5/2011 | Maier |
| 8,570,989 B1 * | 10/2013 | Mahler et al. .................. 455/419 |
| 2001/0011247 A1 | 8/2001 | O'Flaherty |
| 2001/0015756 A1 | 8/2001 | Wilcock |
| 2001/0016849 A1 | 8/2001 | Squibbs |
| 2002/0032036 A1 | 3/2002 | Nakajima |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069239 A1 | 6/2002 | Katada |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086683 A1 | 7/2002 | Kohar |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0123354 A1 | 9/2002 | Nowak |
| 2002/0126656 A1 | 9/2002 | Park |
| 2002/0130906 A1 | 9/2002 | Miyaki |
| 2002/0158777 A1 | 10/2002 | Flick |
| 2002/0164998 A1 | 11/2002 | Younis |
| 2002/0169539 A1 | 11/2002 | Menard |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0014487 A1 | 1/2003 | Iwakawa |
| 2003/0016804 A1 | 1/2003 | Sheha |
| 2003/0026245 A1 | 2/2003 | Ejzak |
| 2003/0032448 A1 | 2/2003 | Bulthius |
| 2003/0036848 A1 | 2/2003 | Sheha |
| 2003/0036949 A1 | 2/2003 | Kaddeche |
| 2003/0037163 A1 | 2/2003 | Kitada |
| 2003/0040272 A1 | 2/2003 | Lelievre |
| 2003/0045327 A1 | 3/2003 | Kobayashi |
| 2003/0054835 A1 | 3/2003 | Gutowski |
| 2003/0060938 A1 | 3/2003 | Duvall |
| 2003/0065788 A1 | 4/2003 | Salomaki |
| 2003/0072318 A1 | 4/2003 | Lam |
| 2003/0078054 A1 | 4/2003 | Okuda |
| 2003/0078064 A1 | 4/2003 | Chan |
| 2003/0081557 A1 | 5/2003 | Mettala |
| 2003/0096623 A1 | 5/2003 | Kim |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |

(56) References Cited

U.S. PATENT DOCUMENTS

| | | |
|---|---|---|
| 2003/0119528 A1 | 6/2003 | Pew |
| 2003/0125064 A1 | 7/2003 | Koskinen |
| 2003/0125085 A1 | 7/2003 | Collins |
| 2003/0126250 A1 | 7/2003 | Jhanji |
| 2003/0137961 A1 | 7/2003 | Tsirtsis |
| 2003/0149526 A1 | 8/2003 | Zhou |
| 2003/0151501 A1 | 8/2003 | Teckchandani |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0165254 A1 | 9/2003 | Chen |
| 2003/0182053 A1 | 9/2003 | Swope |
| 2003/0186709 A1 | 10/2003 | Rhodes |
| 2003/0196105 A1 | 10/2003 | Fineburg |
| 2003/0201931 A1 | 10/2003 | Durst |
| 2003/0204640 A1 | 10/2003 | Sahineja |
| 2003/0223381 A1 | 12/2003 | Schroderus |
| 2003/0231190 A1 | 12/2003 | Jawerth |
| 2003/0236618 A1 | 12/2003 | Kamikawa |
| 2004/0002326 A1 | 1/2004 | Maher |
| 2004/0002814 A1 | 1/2004 | Gogic |
| 2004/0008225 A1 | 1/2004 | Cambell |
| 2004/0021567 A1 | 2/2004 | Dunn |
| 2004/0032485 A1 | 2/2004 | Stephens |
| 2004/0041729 A1 | 3/2004 | Rowitch |
| 2004/0043775 A1 | 3/2004 | Kennedy |
| 2004/0044623 A1 | 3/2004 | Wake |
| 2004/0047342 A1 | 3/2004 | Gavish |
| 2004/0047461 A1 | 3/2004 | Weisman et al. |
| 2004/0054428 A1 | 3/2004 | Sheha |
| 2004/0068724 A1 | 4/2004 | Gardner |
| 2004/0076277 A1 | 4/2004 | Kuusinen |
| 2004/0098497 A1 | 5/2004 | Banet |
| 2004/0124977 A1 | 7/2004 | Biffar |
| 2004/0132465 A1 | 7/2004 | Mattila |
| 2004/0146040 A1 | 7/2004 | Phan-Anh |
| 2004/0181689 A1 | 9/2004 | Kiyoto |
| 2004/0184584 A1 | 9/2004 | McCalmont |
| 2004/0186880 A1 | 9/2004 | Yamamoto |
| 2004/0190497 A1 | 9/2004 | Knox |
| 2004/0198332 A1 | 10/2004 | Lundsgaard |
| 2004/0198375 A1 | 10/2004 | Schwengler |
| 2004/0198386 A1 | 10/2004 | Dupray |
| 2004/0204829 A1 | 10/2004 | Endo |
| 2004/0204847 A1 | 10/2004 | Yanai |
| 2004/0205151 A1 | 10/2004 | Sprigg |
| 2004/0205517 A1 | 10/2004 | Lampert |
| 2004/0220957 A1 | 11/2004 | McDonough |
| 2004/0229632 A1 | 11/2004 | Flynn |
| 2004/0242238 A1 | 12/2004 | Wang |
| 2004/0267445 A1 | 12/2004 | De Luca |
| 2005/0027445 A1 | 2/2005 | McDonough |
| 2005/0028034 A1 | 2/2005 | Gantman |
| 2005/0031095 A1 | 2/2005 | Pietrowics |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0053209 A1 | 3/2005 | D'Evelyn |
| 2005/0062636 A1 | 3/2005 | Conway |
| 2005/0063519 A1 | 3/2005 | James |
| 2005/0071671 A1 | 3/2005 | Karaoguz |
| 2005/0078612 A1 | 4/2005 | Lang |
| 2005/0083911 A1 | 4/2005 | Grabelsky |
| 2005/0085999 A1 | 4/2005 | Onishi |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0112030 A1 | 5/2005 | Gaus |
| 2005/0119012 A1 | 6/2005 | Merheb |
| 2005/0125148 A1 | 6/2005 | Van Buer |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0159883 A1 | 7/2005 | Humphries |
| 2005/0174991 A1 | 8/2005 | Keagy |
| 2005/0190746 A1 | 9/2005 | Xiong |
| 2005/0190892 A1 | 9/2005 | Dawson |
| 2005/0192822 A1 | 9/2005 | Hartenstein |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0219067 A1 | 10/2005 | Chung |
| 2005/0232252 A1 | 10/2005 | Hoover |
| 2005/0239458 A1 | 10/2005 | Hurtta |
| 2005/0242168 A1 | 11/2005 | Tesavis |
| 2005/0255857 A1 | 11/2005 | Kim |
| 2005/0259675 A1 | 11/2005 | Tuohino |
| 2005/0261002 A1 | 11/2005 | Cheng |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0019724 A1 | 1/2006 | Bahl |
| 2006/0023747 A1 | 2/2006 | Koren et al. |
| 2006/0026288 A1 | 2/2006 | Acharya |
| 2006/0031684 A1 * | 2/2006 | Sharma et al. ............ 713/186 |
| 2006/0041375 A1 | 2/2006 | Witmer |
| 2006/0053225 A1 | 3/2006 | Poikselka |
| 2006/0058102 A1 | 3/2006 | Nguyen et al. |
| 2006/0068753 A1 | 3/2006 | Karpen |
| 2006/0069503 A1 | 3/2006 | Suomela |
| 2006/0072729 A1 | 4/2006 | Lee et al. |
| 2006/0074547 A1 | 4/2006 | Kaufman |
| 2006/0077911 A1 | 4/2006 | Shaffer |
| 2006/0088152 A1 | 4/2006 | Green |
| 2006/0104306 A1 | 5/2006 | Adamczkk |
| 2006/0120517 A1 | 6/2006 | Moon |
| 2006/0128357 A1 * | 6/2006 | Suryanarayana et al. . 455/404.2 |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0200359 A1 | 9/2006 | Khan |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0233338 A1 | 10/2006 | Venkata |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |
| 2006/0259365 A1 | 11/2006 | Agarwal et al. |
| 2006/0268120 A1 | 11/2006 | Funakura |
| 2006/0270421 A1 | 11/2006 | Phillips |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0004461 A1 | 1/2007 | Bathina |
| 2007/0014282 A1 | 1/2007 | Mitchell |
| 2007/0019614 A1 | 1/2007 | Hoffman |
| 2007/0021908 A1 | 1/2007 | Jaugilas |
| 2007/0022011 A1 | 1/2007 | Altberg et al. |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0032244 A1 | 2/2007 | Counts |
| 2007/0036139 A1 | 2/2007 | Patel |
| 2007/0041516 A1 | 2/2007 | Dickinson |
| 2007/0049288 A1 | 3/2007 | Lamprecht |
| 2007/0054676 A1 | 3/2007 | Duan |
| 2007/0060097 A1 | 3/2007 | Edge |
| 2007/0072553 A1 | 3/2007 | Barbera |
| 2007/0081635 A1 | 4/2007 | Croak |

(56) References Cited

U.S. PATENT DOCUMENTS

| | | |
|---|---|---|
| 2007/0083911 A1 | 4/2007 | Madden |
| 2007/0115941 A1 | 5/2007 | Patel |
| 2007/0121601 A1 | 5/2007 | Kikinis |
| 2007/0139411 A1 | 6/2007 | Jawerth |
| 2007/0149166 A1 | 6/2007 | Turcotte |
| 2007/0149213 A1 | 6/2007 | Lamba |
| 2007/0162228 A1 | 7/2007 | Mitchell |
| 2007/0177603 A1* | 8/2007 | Calme et al. ............... 370/395.2 |
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2007/0208687 A1 | 9/2007 | O'Connor |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270164 A1 | 11/2007 | Maier |
| 2007/0291733 A1 | 12/2007 | Doran |
| 2008/0026728 A1* | 1/2008 | Snapp et al. ............... 455/414.1 |
| 2008/0031202 A1 | 2/2008 | Benveniste |
| 2008/0032703 A1 | 2/2008 | Krumm |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0077324 A1 | 3/2008 | Hatano |
| 2008/0080691 A1 | 4/2008 | Dolan |
| 2008/0117859 A1 | 5/2008 | Shahidi |
| 2008/0129475 A1 | 6/2008 | Breed |
| 2008/0162637 A1 | 7/2008 | Adamczyk |
| 2008/0176582 A1 | 7/2008 | Ghai |
| 2008/0186164 A1 | 8/2008 | Emigh |
| 2008/0195314 A1 | 8/2008 | Green |
| 2008/0200182 A1 | 8/2008 | Shim |
| 2008/0214202 A1 | 9/2008 | Toomey |
| 2008/0220747 A1 | 9/2008 | Ashkenazi |
| 2008/0288166 A1 | 11/2008 | Onishi |
| 2008/0316976 A1 | 12/2008 | Thompson |
| 2009/0003535 A1 | 1/2009 | Grabelsky |
| 2009/0067417 A1 | 3/2009 | Kalavade |
| 2009/0097450 A1 | 4/2009 | Wallis |
| 2009/0113346 A1 | 4/2009 | Wickramasuriya |
| 2009/0128404 A1 | 5/2009 | Martino |
| 2009/0177557 A1 | 7/2009 | Klein |
| 2009/0215466 A1 | 8/2009 | Ahl |
| 2009/0224931 A1 | 9/2009 | Dietz |
| 2009/0298488 A1 | 12/2009 | Snapp |
| 2009/0328163 A1 | 12/2009 | Preece |
| 2010/0003976 A1 | 1/2010 | Zhu |
| 2010/0004993 A1 | 1/2010 | Troy |
| 2010/0029244 A1 | 2/2010 | Moodibri |
| 2010/0042592 A1 | 2/2010 | Stolz |
| 2010/0062788 A1 | 3/2010 | Nagorniak |
| 2010/0067444 A1 | 3/2010 | Faccin |
| 2010/0069034 A1 | 3/2010 | Dickinson |
| 2010/0167760 A1 | 7/2010 | Kim |
| 2010/0188992 A1 | 7/2010 | Raleigh |
| 2010/0268848 A1 | 10/2010 | Maurya |
| 2010/0328093 A1 | 12/2010 | Robinson |
| 2011/0026440 A1* | 2/2011 | Dunn et al. ............... 370/259 |
| 2011/0051918 A1* | 3/2011 | Fan et al. ............... 379/211.02 |
| 2011/0113060 A1 | 5/2011 | Martini |
| 2011/0149953 A1 | 6/2011 | Helgeson |
| 2011/0165861 A1 | 7/2011 | Wilson et al. |
| 2011/0176667 A1 | 7/2011 | Kumar |
| 2011/0312305 A1 | 12/2011 | Jajodia |
| 2013/0295889 A1* | 11/2013 | Das ............... 455/414.1 |

FOREIGN PATENT DOCUMENTS

| | | |
|---|---|---|
| WO | WO01/45342 | 6/2001 |
| WO | WO02/11407 | 2/2002 |
| WO | WO2004/025941 | 3/2004 |
| WO | WO2005051033 | 6/2005 |
| WO | WO2007/027166 | 3/2007 |

OTHER PUBLICATIONS

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

$3^{rd}$ Generation Partnership Project 2, Position Determination Service Standard for Dual Mode Spread Spectrum Systems, Feb. 16, 2001, pp. i-X, 1-1-1-5, 2-1-2-2, 3-1-3-51, 4-1-4-66, A-1-A-2, B-1-B-2, C-1-C-2, D-1-D-2.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Extended European Search Report from EPO in European Appl. No. 06827172.5 dated Dec. 29, 2009.

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Nars Haran, U.S. Cellular, Packet Data—Roaming and LBS Overview, Nov. 2, 2007, pp. 1-15.

Location Based Services V2 Roaming Support (non proprietary), 80-V8470-2NP A, dated Jan. 27, 2005, pp. 1-56.

Yilin Zhao, Efficient and reliable date transmission for cellular and GPS based mayday systems, Nov. 1997, IEEE, IEEE Conference on Intelligent Transportation System, 1997. ITSC 97, 555-559.

Examiner's Office Letter in Japanese Patent Application No. 2006-542691 dated Sep. 7, 2009.

Nena Interim VoIP Architecture for Enhanced 9-1-1 Services (i2) Nena 08-001, Issue 1, Dec. 6, 2005.

International Search Report received in PCT/US2012/00422 dated Aug. 27, 2013.

International Search Report received in PCT/US2012/000422 dated Dec. 10, 2012.

Schulzrinne et al., Emergency Services for Internet Telephony Systems draft-schulzrinne-sipping-emergency-arch, IETF Standard Working Draft, Feb. 4, 2004, 1-22.

International Search Report received in PCT/US2013/055100 dated Nov. 15, 2013.

International Preliminary Report on Patentability received in PCT/US2013/055100 dated Feb. 26, 2015.

* cited by examiner

DEVICE INDEPENDENT CALLER DATA ACCESS FOR EMERGENCY CALLS

The present invention claims priority from U.S. Provisional No. 61/683,506, filed Aug. 15, 2012, entitled "Device Independent Caller Data Access for Emergency Calls", the entirety of which is expressly incorporated herein by reference.

BACKGROUND OF THE INVENTION

1. Field of the Invention

This invention relates generally to wireless telecommunication. More particularly, it relates to public safety emergency services.

2. Background of Related Art

Caller location is the only data that is currently routed to emergency dispatch personnel with an emergency communications event. While caller location is sufficient to dispatch emergency responders to the site of an emergency, caller location does not help emergency responders to more effectively alleviate an emergency situation.

In a recently proposed technology, stored caller data is routed to emergency dispatch personnel with an emergency communications event. Stored caller data typically includes rich subscriber information, e.g., an emergency contact list, medical data, drug history, allergies, etc., that may be of use to emergency dispatch personnel in the event of an emergency.

In accordance with the proposed technology, when an emergency call is made, call data (e.g. caller profile data, caller location, etc.) is ascertained based on calling device information, such as a call back number (CBN). Calling device information is sufficient to determine caller location. However, issues arise when device dependant data is used to retrieve stored caller data for routing with an emergency communications event. For instance, many times, a caller may use a device that is not their own to initiate an emergency communications event. If stored caller data is retrieved based on calling device information, and a caller is using somebody else's device to initiate an emergency communications event, then that communications event is likely routed to emergency dispatch personnel with irrelevant caller data.

SUMMARY

Methods and an apparatus for providing device independent access to stored caller data during an emergency communications event (e.g. a 911 call), comprises a call server. In accordance with the principles of the present invention, an inventive call server intercepts an emergency communications event (e.g. a 911 call) and determines the capabilities of a calling device, e.g., hypertext transfer protocol (HTTP) capabilities, short message service (SMS) capabilities, dual tone multi-frequency (DTMF) signaling capabilities, etc. Based on calling device capability, the call server uses one or more of the following device independent methods to ascertain a caller identity, independent of a calling device: interactive voice response (IVR) redirect, hypertext transfer protocol (HTTP) authentication, session initiation protocol (SIP) INFO method, biometric recognition, human interaction, and/or alternate number dialing.

Once caller identity is established, the call server queries a subscriber database for a unique caller profile database (CPDB) key assigned to the caller (unless a caller profile database (CPDB) key is already determined). The call server then uses the unique caller profile database (CPDB) key to query a caller profile database (CPDB) for relevant caller data. A unique caller profile database (CPDB) key points to a specific caller profile stored in the caller profile database (CPDB).

In accordance with the principles of the present invention, a caller profile database (CPDB) maintains caller profiles for individual subscriber entities, for use during an emergency communications event. A caller profile stored in a caller profile database (CPDB) preferably contains rich subscriber information, e.g., medical history, allergy lists, emergency contact lists, etc., that may be of use to emergency dispatch personnel in the event of an emergency.

In accordance with the principles of the present invention, caller profile data obtained for an emergency services caller is routed with an emergency communications event to an emergency call processing system (e.g. an emergency services IP network (ESInet)). Emergency dispatch personnel (e.g. a public safety answering point (PSAP)) may then use received caller data to more effectively address an emergency situation.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides methods and an apparatus for providing device independent access to stored caller data during an emergency communications event.

Recently, it has been proposed that a caller profile database (CPDB) maintain caller profiles for individual subscriber entities, for use during an emergency communications event. Caller profiles preferably contain rich subscriber information (e.g., an emergency contact list, medical data, an allergy list, drug history, etc.), that may be of use to emergency dispatch personnel in the event of an emergency. In accordance with the proposed technology, caller profile data is routed to emergency dispatch personnel in accompany to each emergency communications event initiated thereto.

Conventionally, when an emergency call is made, call data, e.g., caller identity, caller location, caller profile data, etc., is ascertained based on calling device information, such as a callback number (CBN). However, the present inventors have appreciated that issues arise when calling device information is to be used to retrieve caller specific profile data for an emergency services caller. In particular, the present inventors have appreciated that, many times, a caller may initiate an emergency communications event from a device that is not their own. If stored caller data is retrieved and routed with an emergency communications event based on calling device information, and a caller is using somebody else's device to initiate an emergency communications event, then that communications event is likely routed to emergency dispatch personnel with irrelevant caller data.

The present invention provides device independent methods for accessing stored caller data during an emergency communications event (e.g. a 911 call) to ensure that accurate caller data is routed with an emergency communications event, even in the case that a caller is using somebody else's device to initiate the event.

Figure 1:
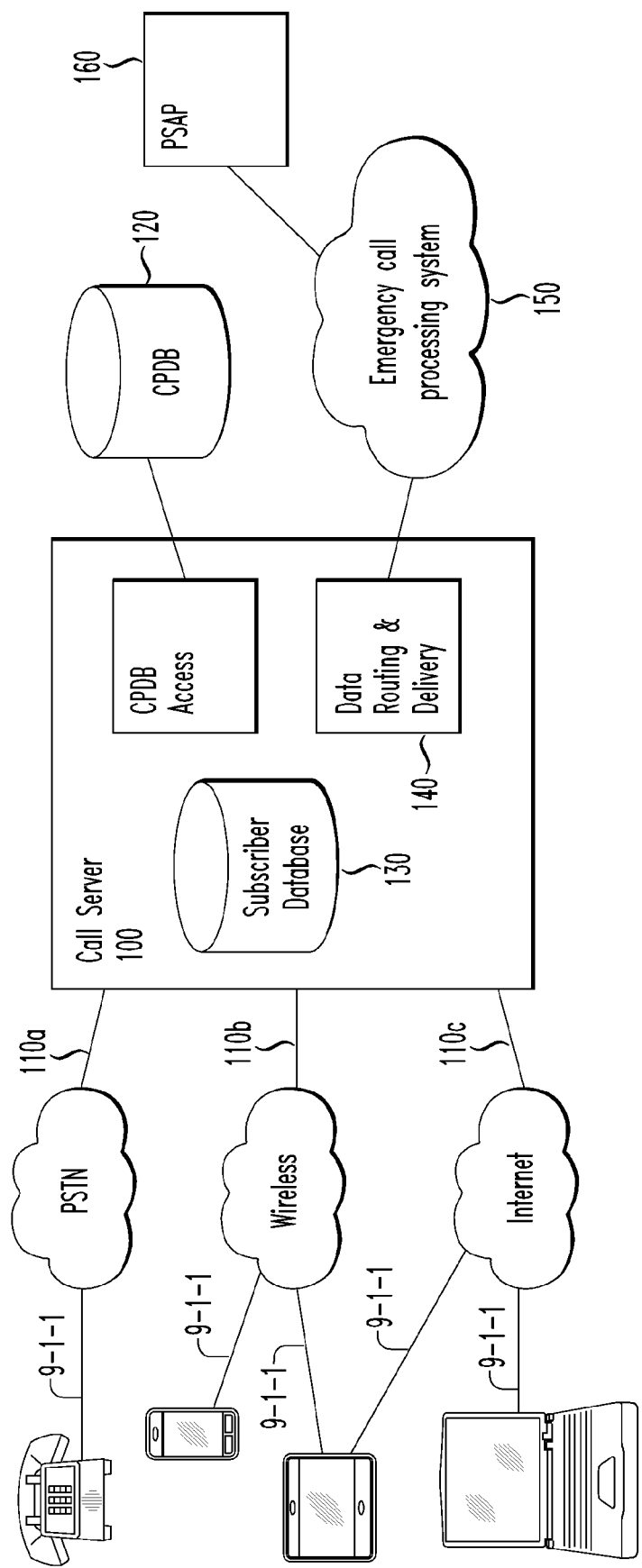
FIG. 1 depicts an exemplary network structure for providing device independent access to stored caller data during an emergency communications event, in accordance with the principles of the present invention.

In accordance with the principles of the present invention, an inventive call server intercepts an emergency communications event and obtains caller data preprovisioned for an emergency services caller, via methods independent of a calling device FIG. 1 depicts an exemplary call server, in accordance with the principles of the present invention.

In particular, as depicted in FIG. 1, an inventive call server 100 intercepts emergency communications events (e.g. 911 calls) 110*a*-110*c* and retrieves caller data preprovisioned for identified calling entities, from a centralized caller profile database (CPDB) 120. In accordance with the principles of the present invention, a caller profile database (CPDB) 120 maintains caller profiles for individual subscriber entities, and is housed, maintained, and updated by an entity other than the inventive call server 100.

In accordance with the principles of the present invention, a subscriber database 130 is housed on the inventive call server 100. A subscriber database 130 maintains a mapping of subscriber entities and unique caller profile database (CPDB) keys. A caller profile database (CPDB) key points to a specific caller profile stored in the caller profile database (CPDB) 120. In accordance with the principles of the present invention, a unique caller profile database (CPDB) key is used to retrieve a caller profile preprovisioned for an identified calling entity, during an emergency communications event.

As portrayed in FIG. 1, the inventive call server 100 routes and delivers 140 caller profile data obtained for an emergency services caller to an emergency call processing system 150. There, caller data is subsequently forwarded to an appropriate public safety answering point (PSAP) (i.e. emergency dispatch personnel) 160.

Figure 2:
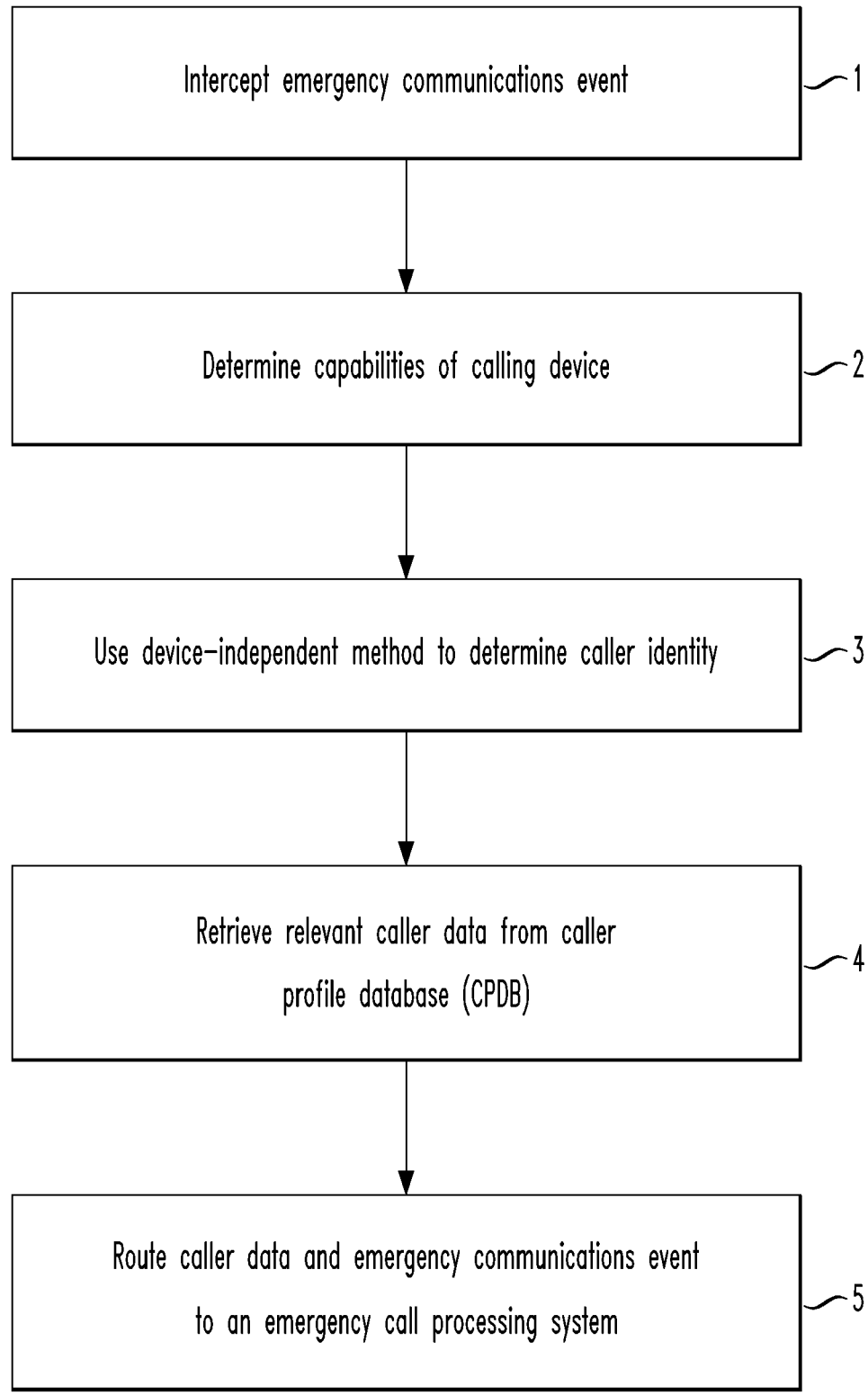
FIG. 2 depicts an exemplary method for providing device independent access to stored caller data during an emergency communications event, in accordance with the principles of the present invention.

FIG. 2 depicts an exemplary method for providing device independent access to stored caller data during an emergency communications event, in accordance with the principles of the present invention.

In particular, as depicted in steps 1 and 2 of FIG. 2, a call server 100 intercepts an emergency communications event and uses device capability detection functionalities to determine the capabilities of an originating communications device, e.g., HTTP capabilities, wireless capabilities, DTMF capabilities, etc.

In accordance with the principles of the present invention, the inventive call server 100 preferably determines the capabilities of an originating communications device 130 via analysis of an incoming trunk type and via identification of a signaling type carried thereon. For instance, the inventive call server 100 considers an emergency services call carried on incoming public switched telephone network (PSTN) trunks (i.e. integrated services digital network user part (ISUP) signaling) as having been originated on a plain old telephone service (POTS) device, and capable of dual-tone multi-frequency (DTMF) signaling. Moreover, the inventive call server 100 considers an emergency services call carried on incoming wireless trunks to have been originated on a wireless device and capable of performing wireless functionalities. Additional information regarding the capabilities of a wireless device is determined via Interim Standard 41 (IS41) signaling (code division multiple access (CDMA)), mobile application part (MAP) signaling (global system for mobile communications (GSM)) and/or camel application part (CAP) signaling (GSM intelligent network). Furthermore, the inventive call server 100 considers an emergency services call coming in on session initiation protocol (SIP) trunks and carrying SIP signaling as having been originated on a device with voice over internet protocol (VoIP) capabilities (in accordance with reference (RFC) 3261). Likewise, the inventive call server considers an emergency communications event carried on an incoming data session to have been initiated via a hypertext transfer protocol (HTTP) client and originated on a device with web capabilities. Further, a short message service (SMS) request for caller profile database (CPDB) information is considered originated on a device with SMS capabilities.

As shown in step 3 of FIG. 2, following device capability detection the inventive call server 100 uses one or more of the following device independent methods to determine and authenticate the identity of an emergency services caller, independent of a calling device: interactive voice response (IVR) redirect, session initiate protocol (SIP) INFO method, hypertext transfer protocol (HTTP) authentication, biometric recognition, human interaction, and/or alternate number dialing.

Once a caller identity is established, the call server 100 accesses a caller profile database (CPDB) 120 to retrieve caller profile data preprovisioned for the emergency services caller, as depicted in step 4. In step 5, relevant caller data is routed with the intercepted emergency communications event to an emergency call processing system 150, whereupon a public safety answering point (PSAP) (i.e. emergency dispatch personnel) 160 may use the caller data to better address an emergency situation.

In accordance with the principles of the present invention, a device independent caller identification method is selected for an emergency communications event based on calling device capabilities.

For instance, a device independent IVR redirect method is preferably used to ascertain a caller identity for an emergency services call originated on a device that has dual-tone multi-frequency (DTMF) signaling (e.g. a landline phone, a simple cell phone, etc.) capabilities, only.

Figure 3:
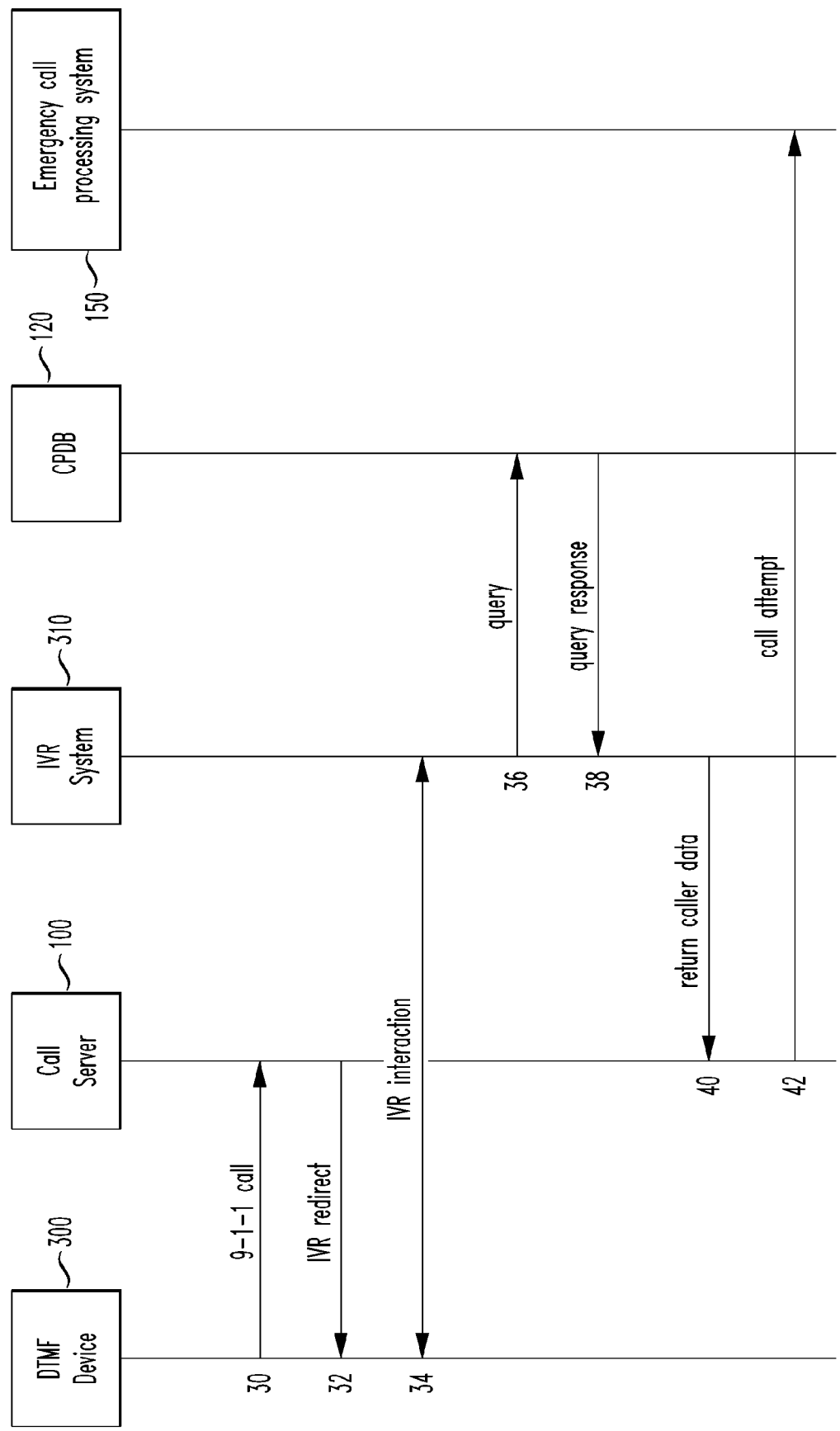
FIG. 3 depicts an exemplary device independent IVR redirect method used to ascertain a caller identity and pull caller profile database (CPDB) information during an emergency communications event, in accordance with the principles of the present invention.

FIG. 3 depicts an exemplary device independent IVR redirect method used to ascertain a caller identity and pull caller profile database (CPDB) information during an emergency communications event, in accordance with the principles of the present invention.

In particular, as depicted in step 30 of FIG. 3, a call server 100 intercepts an emergency communications event and determines that an originating communications device 300 is DTMF capable, only, e.g., a landline phone, a simple cell phone, etc. In step 32, the call server 100 redirects the emergency communications event to an IVR system 310, with access to a caller profile database (CPDB) 120. As shown in step 34, on receiving prompts from the IVR system 310, an emergency services caller provides his/her unique caller profile database (CPDB) key, and any additional authentication information (e.g., date of birth (DOB), etc.), via DTMF digits. In step 36, the IVR system 310 uses information supplied by the emergency services caller to query a caller profile database (CPDB) 120 for relevant caller data. In steps 38 and 40, relevant caller data is obtained for the emergency services caller and returned to the inventive call server 100. The call server 100 then routes relevant caller data and the emergency services call to an emergency call processing system 150, as portrayed in step 42.

In accordance with the principles of the present invention, a caller may also request to be redirected to an IVR system 310 following emergency call setup.

Figure 4:
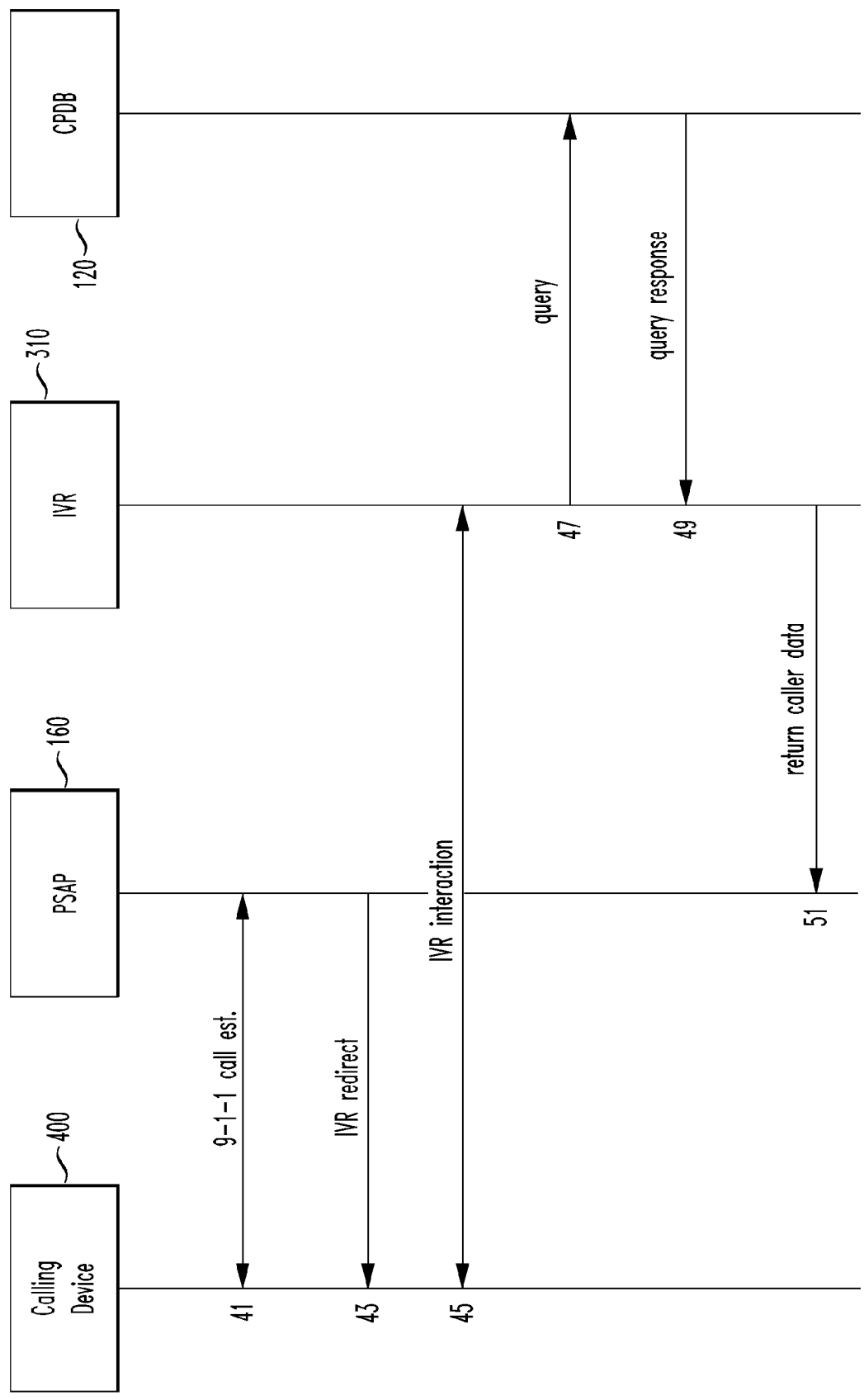
FIG. 4 depicts exemplary IVR redirect following emergency call setup, in accordance with the principles of the present invention.

FIG. 4 depicts exemplary IVR redirect following emergency call setup, in accordance with the principles of the present invention.

In particular, once an emergency communications event is routed to a public safety answering point (PSAP) 160, a caller may enter a specific dual-tone multi-frequency signaling (DTMF) code (step 41) via a calling device 400, to request a redirect (step 43) to an IVR system 310. Upon redirect, a caller is prompted to enter his/her unique caller profile database (CPDB) key, and any additional authentication information, e.g., a date of birth (DOB), etc., via DTMF digits (step 45). As depicted in steps 47 and 49, the IVR system 310 then uses supplied caller information to obtain relevant caller data from a caller profile database (CPDB) 120. Relevant caller data is then routed back to the public safety answering point (PSAP) 160, as portrayed in step 51.

In accordance with the principles of the present invention, a device independent hypertext transfer protocol (HTTP) authentication method is preferably used to ascertain a caller identity for an emergency communications event originated on a web-enabled device (e.g. a thin client application on a smart device).

Figure 5:
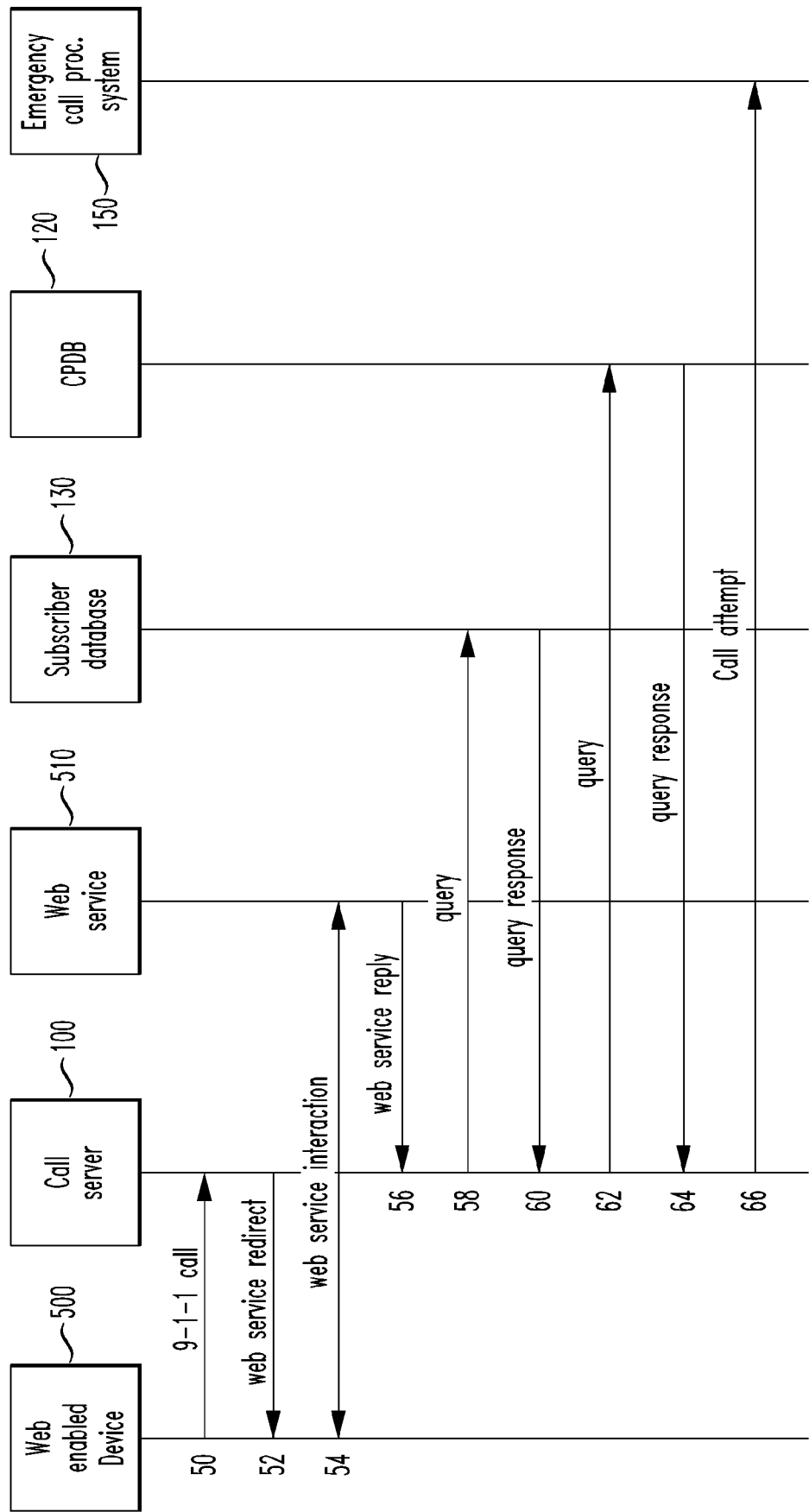
FIG. 5 depicts an exemplary device independent HTTP authentication method used to ascertain a caller identity and pull caller profile database (CPDB) information during an emergency communications event, in accordance with the principles of the present invention.

FIG. 5 depicts an exemplary device independent HTTP authentication method used to ascertain a caller identity and pull caller profile database (CPDB) information during an emergency communications event, in accordance with the principles of the present invention.

In particular, as depicted in step 50 of FIG. 5, an emergency communications event originated on a web-enabled device (an initiated via an HTTP client) 500 is received on the inventive call server 100. In step 52, the call server 100 identifies 100 the calling device 500 as web-enabled and redirects the emergency services caller to an emergency call web service 510. As portrayed in step 54, the emergency call web service 510 prompts the emergency services caller to provision caller identification credentials into a web form. As shown in step 56, the web service returns caller information provisioned in to the web form to the call server 100, and the call server 100 uses supplied caller information to ascertain a caller identity. In step 58, the call server 100 queries a subscriber database 130 for a caller profile database (CPDB) key assigned to the identified caller (unless a caller profile database (CPDB) key is already determined). As depicted in steps 60 and 62, the subscriber database 130 returns the caller's unique caller profile database (CPDB) key to the call server 100 and the call server 100 uses the key to query a caller profile database (CPDB) 120 for relevant caller data. In steps 64 and 66, the call server 100 retrieves relevant caller data from the caller profile database (CPDB) 120 and then passes relevant caller data with the intercepted emergency communications event to an emergency call processing system 150.

In accordance with the principles of the present invention, a device independent session initiation protocol (SIP) INFO method is preferably used to ascertain a caller identity and retrieve stored caller data for an emergency communications event originated on a device with VoIP capabilities. In accordance with reference (RFC) 6086, a SIP INFO message carries application level information between end points using a SIP dialog signaling path. The purpose of a SIP INFO message is not to update characteristics of a SIP dialog or session, but rather to enable applications using a SIP session to exchange information (which may update the state of those applications).

Figure 6:
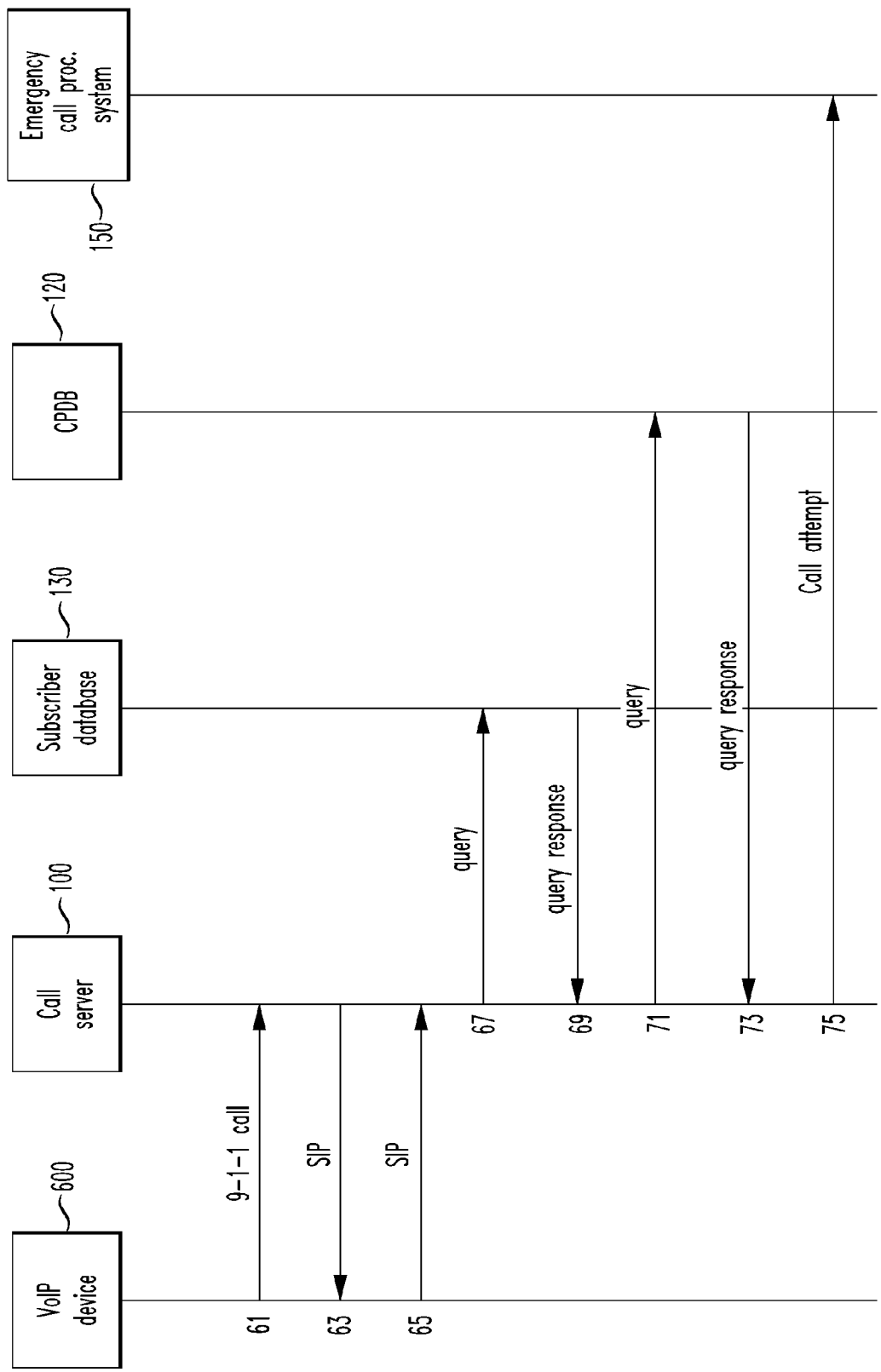
FIG. 6 depicts an exemplary device independent SIP INFO method used to ascertain a caller identity and pull caller profile database (CPDB) information during an emergency communications event, in accordance with the principles of the present invention.

FIG. 6 depicts an exemplary device independent SIP INFO method used to ascertain a caller identity and pull caller profile database (CPDB) information during an emergency communications event, in accordance with the principles of the present invention.

In particular, as depicted in step 61 of FIG. 6, an emergency communications event originated on a VoIP-capable device 600 is received on the inventive call server 100. In step 63, the call server 100 identifies the calling device 600 as having VOIP capabilities, and sends a request for caller identification information to the originating communications device, via SIP signaling. As depicted in step 65, a caller provisions identification credentials into a SIP INFO message and routes the SIP INFO message back to the call server 100. The call server 100 then uses caller identification credentials received in the SIP INFO message to ascertain a caller identity. In step 67, the call server 100 queries a subscriber database 150 for a unique caller profile database (CPDB) key assigned to the identified calling entity (unless a caller profile database (CPDB) key is already determined). As shown in steps 69 and 71, the call server 100 receives the caller profile database (CPDB) key assigned to the caller and uses the key to query a caller profile database (CPDB) 120 for relevant caller data. In steps 73 and 75, relevant caller data is returned to the call server 100 and the call server 100 routes relevant caller data and the intercepted emergency communications event to an emergency call processing system 150.

In accordance with the principles of the present invention, an inventive device independent biometric recognition method is preferably used to ascertain a caller identity and retrieve stored caller data for an emergency communications event originated on a device capable of obtaining and sending biometric data.

Figure 7:
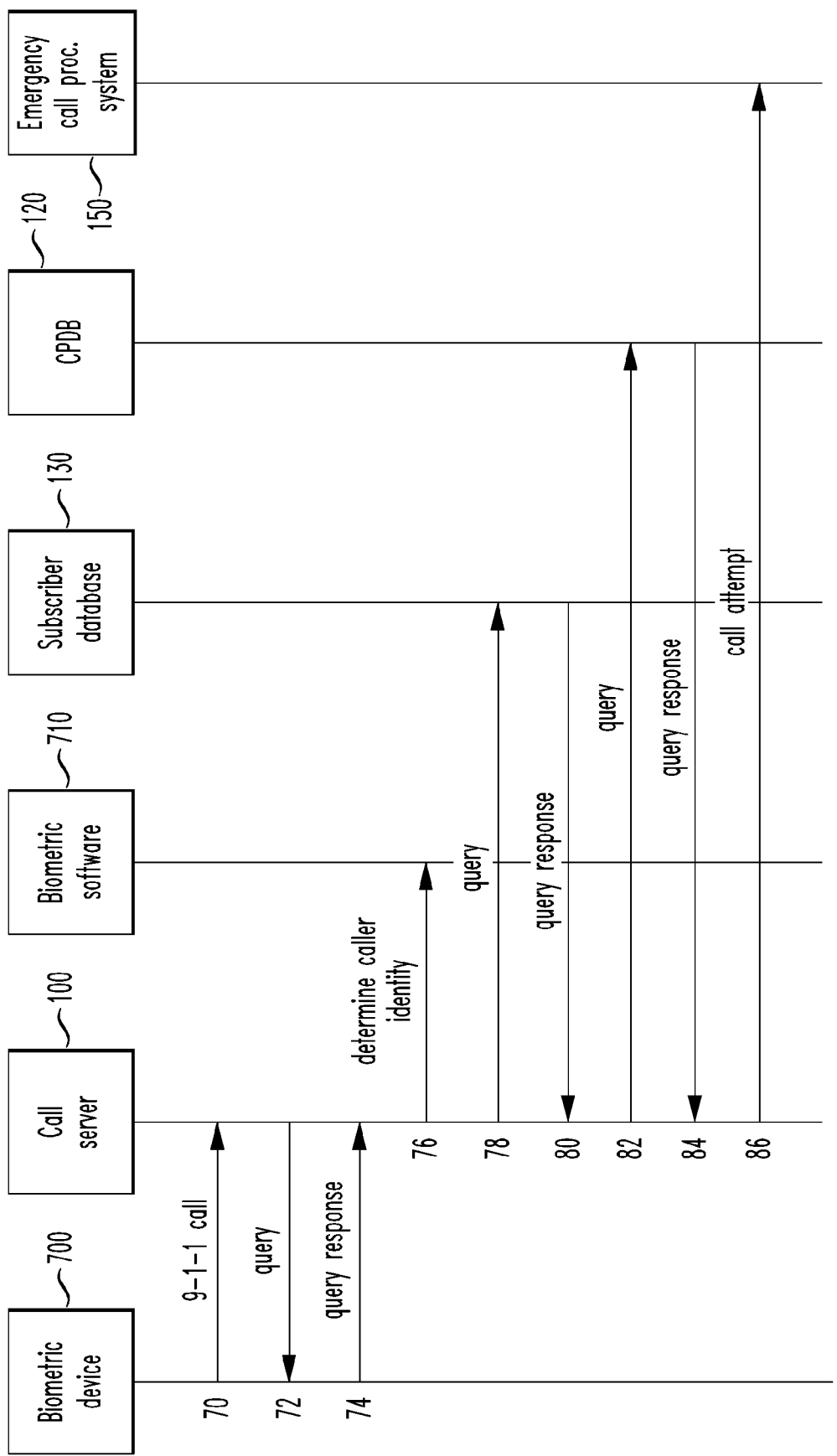
FIG. 7 depicts an exemplary device independent biometric recognition method used to ascertain a caller identity and pull caller profile database (CPDB) information during an emergency communications event, in accordance with the principles of the present invention.

FIG. 7 depicts an exemplary device independent biometric recognition method used to ascertain a caller identity and pull caller profile database (CPDB) information during an emergency communications event, in accordance with the principles of the present invention.

In particular, as depicted in step 70 of FIG. 7, an emergency communications event originated on a device 700 capable of obtaining and routing biometric information, is received on the inventive call server 100. In step 72, the call server 100 identifies the originating communications device 700 as a biometric-enabled device, and sends a request for biometric data to the originating communications device 700. Exemplary biometric data includes: a thumb print, a face picture, a voice sample, etc. In steps 74 and 76, the call server 100 receives biometric data gathered for an emergency services caller from the originating communications device 700, and subsequently employs conventional biometric software 710 to ascertain a caller identity based thereon. For example, a call server 100 may employ conventional face recognition software to determine a caller identity based on a face picture of an emergency services caller. Moreover, the call server 100 may maintain a database of prerecorded voice samples for individual subscriber entities. In this case, if a voice sample received for an emergency services caller matches a stored voice sample, caller identity is established.

As shown in step 78, once caller identity is established, the call server 100 queries a subscriber database 130 for a caller profile database (CPDB) key assigned to the caller (unless a caller profile database (CPDB) key is already determined). In steps 80 and 82, the call server receives the caller profile database (CPDB) key assigned to the caller and uses the key to query a caller profile database (CPDB) 120 for relevant caller data. In steps 84 and 86, caller data is returned to the call server 100 and subsequently passed to an emergency call processing system 170.

In accordance with the principles of the present invention, human interaction may also be used to perform device independent caller identification during an emergency communications event. In particular, emergency dispatch personnel (a public safety answering point (PSAP)) 160 may request caller identification information from an emergency services caller following emergency call setup. Caller identification information may then be used to access relevant caller profile database (CPDB) 120 information via a web interface.

Alternate number dialing is yet another device independent method that may be used to ascertain a caller identity during an emergency communications event. In accordance with the principles of the present invention, an emergency communications event initiated via alternate number dialing is routed directly to the inventive call server 100. To enable alternate number dialing, a unique emergency services number must be assigned to a subscriber entity.

Figure 8:
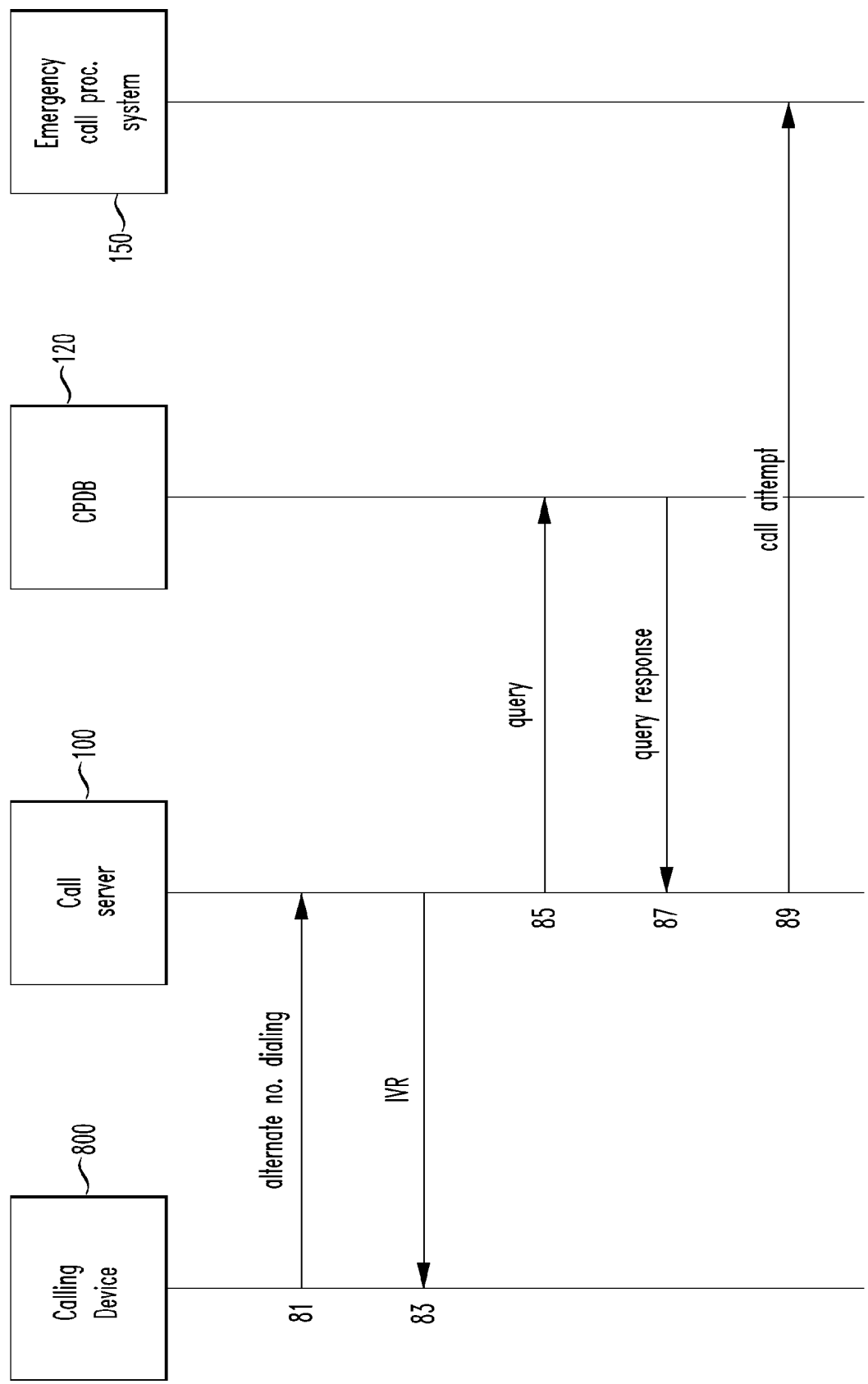
FIG. 8 depicts an exemplary device independent alternate number dialing method used to ascertain a caller identity and pull caller profile database (CPDB) information during an emergency communications event, in accordance with the principles of the present invention.

FIG. 8 depicts an exemplary device independent alternate number dialing method used to ascertain a caller identity and pull caller profile database (CPDB) information during an emergency communications event, in accordance with the principles of the present invention.

In particular, a caller dials a unique emergency services number, seeking emergency services. As depicted in step 81, an emergency services request initiated via alternate number dialing establishes a call between an originating communications device 800 and the inventive call server 100. In step 83, the call server 100 prompts the emergency services caller to enter a unique caller profile database (CPDB) key via DTMF digits. In step 85, the unique caller profile database (CPDB) key furnished by the emergency services caller is used to query a caller profile database (CPDB) 120 for relevant caller data. As depicted in step 87, the caller profile database (CPDB) 120 returns relevant caller data to the inventive call server 100. In step 89, the call server 100 initiates a call to an emergency call processing system 150 on behalf of the emergency services caller and routes relevant caller data therewith.

In accordance with the principles of the present invention, caller data retrieved for an emergency services caller can be routed to an emergency call processing system 150 by reference or by value. In particular, if a public safety answering point (PSAP) 160 in an emergency call processing system 150 is capable of receiving session initiation protocol (SIP) signaling, then caller profile information is embedded as an extensible markup language (XML) attachment in the body of a SIP signaling message and sent to the public safety answering point (PSAP) 160. Alternatively, a reference uniform resource identifier (URI) or a unique caller profile database (CPDB) key (automatic number identification (ANI), pseudo automatic number identification (pANI)) can be delivered to a public safety answering point (PSAP) 160 with an emergency communications event. Emergency dispatch personnel 160 may then use the reference URI/unique key to query a caller profile database (CPDB) 120 for relevant caller data, following the establishment of an emergency services call.

The present invention enables emergency dispatch personnel 160 to make faster life saving decisions and to provide emergency services more rapidly. Moreover, rather than just dispatching general help, the present invention enables emergency dispatch personnel 160 to provide more specific assistance (e.g., fire personnel, medical personnel, etc.) to an emergency services caller. The present invention also relieves an emergency services caller of having to communicate his/her own medical history to medical staffers/emergency dispatch personnel 160.

In accordance with the principles of the present invention, routing relevant caller data to emergency dispatch personnel 160 with an emergency communications event allows emergency first responders to access relevant caller data even before reaching the site of an emergency. The present invention thus leads to enhanced life-saving capabilities.

While the invention has been described with reference to the exemplary embodiments thereof, those skilled in the art will be able to make various modifications to the described embodiments of the invention without departing from the true spirit and scope of the invention.

What is claimed is:

1. A method of providing device independent access to stored caller data during an emergency communications event, comprising:
   intercepting an emergency communications event;
   ascertaining a caller identity of a calling device, independent of said calling device, using at least one of the following device-independent methods to ascertain said caller identity:
      interactive voice response redirect,
      HTTP authentication,
      SIP INFO, and
      biometric recognition;
   retrieving relevant caller data relating to said ascertained caller identity, from a caller profile database (CPDB);
   routing said caller data and said intercepted emergency communications event to an emergency call processing system;
   selecting said at least one device independent method to ascertain caller identity for said emergency communications event based on calling device capabilities; and
   determining said calling device capabilities based on an incoming trunk type and a type of signaling carried thereon.

2. The method of providing device independent access to stored caller data during an emergency communications event according to claim 1, wherein said retrieving relevant caller data comprises:
   retrieving a caller profile database (CPDB) key for said calling device; and
   retrieving relevant caller data from a caller profile database (CPDB) based on said caller profile database (CPDB) key.

3. The method of providing device independent access to stored caller data during an emergency communications event according to claim 1, wherein:
said caller profile database (CPDB) maintains caller profiles for individual subscriber entities.

4. The method of providing device independent access to stored caller data during an emergency communications event according to claim 3, wherein said caller profiles comprise:
rich subscriber information for use during an emergency communications event.

5. The method of providing device independent access to stored caller data during an emergency communications event according to claim 2, wherein:
said caller profile database (CPDB) key points to a specific caller profile in said caller profile database (CPDB).

6. The method of providing device independent access to stored caller data during an emergency communications event according to claim 1, wherein:
said caller identity is determined independent of said calling device via an interactive voice recognition (IVR) redirect method.

7. The method of providing device independent access to stored caller data during an emergency communications event according to claim 1, wherein:
said caller identity is determined independent of said calling device via a hypertext transfer protocol (HTTP) authentication method.

8. The method of providing device independent access to stored caller data during an emergency communications event according to claim 1, wherein:
said caller identity is determined independent of said calling device via a biometric recognition method.

9. The method of providing device independent access to stored caller data during an emergency communications event according to claim 1, wherein:
said caller identity is determined independent of said calling device via a session initiation protocol (SIP) INFO method.

10. The method of providing device independent access to stored caller data during an emergency communications event according to claim 1, wherein:
said caller identity is determined independent of said calling device via an alternate number dialing method.

11. A call server for providing device independent access to stored caller data during an emergency communications event, comprising:
a subscriber database;
access to a caller profile database (CPDB);
means for intercepting an emergency communications event;
means for ascertaining a caller identity of a calling device, independent of said calling device, using at least one of the following device-independent methods to ascertain said caller identity:
interactive voice response redirect,
HTTP authentication,
SIP INFO, and
biometric recognition;
means for retrieving relevant caller data relating to said ascertained caller identity, from a caller profile database (CPDB);
means for routing caller data to an emergency call processing system;
means for using device capability detection functionality to select said at least one device independent method for said emergency communications event based on calling device capabilities including an incoming trunk type and a type of signaling carried thereon.

12. The call server for providing device independent access to stored caller data during an emergency communications event according to claim 11, wherein:
said caller profile database (CPDB) maintains caller profiles for individual subscriber entities.

13. The call server for providing device independent access to stored caller data during an emergency communications event according to claim 12, wherein said caller profiles comprise:
rich subscriber information for use during an emergency communications event.

14. The call server for providing device independent access to stored caller data during an emergency communications event according to claim 11, wherein:
said subscriber database maintains a mapping of subscriber entities and unique caller profile database (CPDB) keys.

15. The call server for providing device independent access to stored caller data during an emergency communications event according to claim 14, wherein:
a caller profile database (CPDB) key points to a specific caller profile in said caller profile database (CPDB).

* * * * *